United States Patent [19]
Matthews et al.

[11] Patent Number: 5,928,705
[45] Date of Patent: *Jul. 27, 1999

[54] COOKED EXTRUDED MEAT PRODUCT COMPRISING ADDITIVE AND METHOD FOR MAKING THE SAME

[75] Inventors: Bernard Trevor Matthews, Norwich; David John Joll, Corpusty; Peter Elwyn Roberts; David Norman Wilson, both of Norwich; John Harry Barker, Sheringham; Carl Richard Reynolds, Fakenham, all of United Kingdom

[73] Assignee: Bernard Matthews PLC, Norwich, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,569

[22] Filed: Apr. 23, 1996

[30]    Foreign Application Priority Data

May 11, 1995  [GB]  United Kingdom ............... 9509585

[51] Int. Cl.$^6$ ..................................... A23L 1/317
[52] U.S. Cl. ............................ 426/646; 426/90; 426/92; 426/105; 426/516; 426/517; 426/518; 426/641
[58] Field of Search ................... 426/516, 517, 426/518, 641, 646, 92, 90, 105

[56]    References Cited

U.S. PATENT DOCUMENTS

| 4,404,229 | 9/1983 | Treharne ................................. 426/513 |
| 4,905,587 | 3/1990 | Smithers . |
| 4,921,714 | 5/1990 | Mathews et al. ......................... 426/90 |
| 5,277,857 | 1/1994 | Nicholson et al. ...................... 264/187 |

FOREIGN PATENT DOCUMENTS

A-0 024 790  3/1981  European Pat. Off. .

OTHER PUBLICATIONS

Webster's Ninth New Collegiate Dictionary Merriam–Webster, Inc, Springfield, MA p. 727, 1986.

*Primary Examiner*—Helen Pratt
*Attorney, Agent, or Firm*—Oliff & Berridge, PLC

[57]    ABSTRACT

A cooked, extruded meat product comprising a meat extrudate having an outwardly facing surface, which meat extrudate is impregnated with an additive in an additive zone which extends inwardly from the surface to a depth of at least 1 mm, typically 1–5 mm. The meat product may comprise a co-extruded layer of fat or meat emulsion disposed circumjacent the meat layer or core. Also provided is a method of making the extruded meat product.

22 Claims, 7 Drawing Sheets

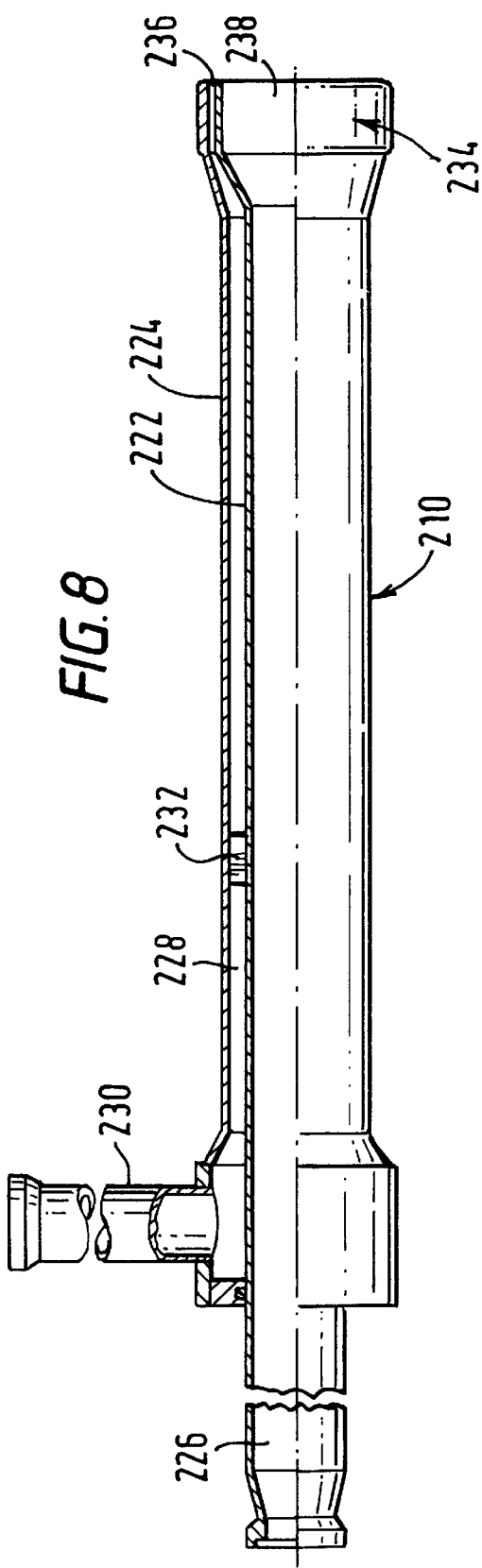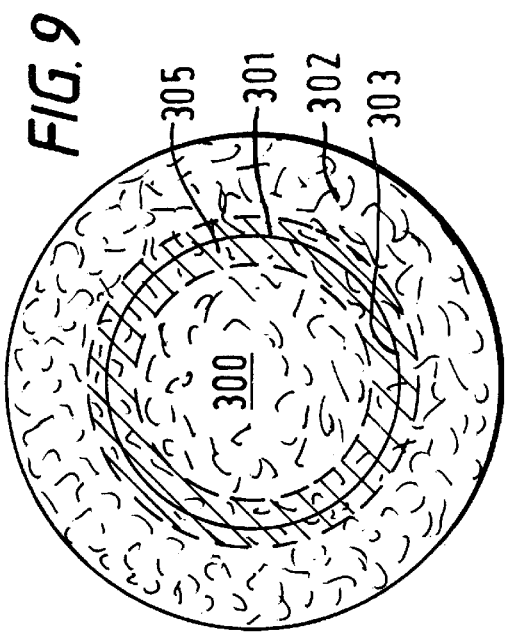

COOKED EXTRUDED MEAT PRODUCT COMPRISING ADDITIVE AND METHOD FOR MAKING THE SAME

The present invention relates to a cooked, extruded meat product comprising an additive such, for example, as a colouring, flavouring or seasoning. The present invention also embraces methods and apparatus for making such a cooked, extruded meat product.

One prior art method for applying an additive to an extruded meat product consists in "painting" the additive in the form of a viscous syrup, by means of a pastry brush or the like, onto an outer surface of the extrudate prior to cooking. The syrup must be sufficiently viscous to remain in place on the product prior to and during cooking. Nevertheless, an amount of the syrup additive will be removed when the product comes into contact with, or rubs against other articles on the bench or in the oven. Furthermore, by using such a viscous additive, it is difficult to achieve a uniform application of the additive on the surface of the meat product.

This method also suffers from the disadvantage that the viscous additive does not penetrate substantially into the meat extrudate. The flavour thus remains concentrated on the outside of the product which is unsatisfactory from the point of view of a consumer. The viscous additive is unprotected on the outer surface of the meat product during cooking and will, to an extent, be denatured as a result of the concentration of heat on the outer surface. Furthermore, the use of the viscous syrup additive makes it difficult to automate the process.

The manual application of additive to the meat substrate is time consuming, and inevitably an amount of the additive will be lost though spillages. The process is also inefficient because the tendency is to apply too much additive to the meat product when trying to obtain complete surface coverage.

U.S. Pat. No. 4,905,587 to Smithers discloses a method for applying liquid smoke and other flavourings to sausages. The liquid smoke is applied to a meat substrate as it debouches a nozzle, and travels in contact with the meat product inside a stuffing horn prior to encasement in a flexible casing. Sufficient liquid smoke may be applied for complete coverage of the surface of the meat substrate, but substantial intermixing of the liquid smoke and meat is avoided to ensure that the liquid smoke does not penetrate the meat by more than one millimeter after the sausage is cooked. In this way the cooked sausage resembles one which has been smoked by a traditional smoking process in a smoke house.

A disadvantage which is inherent in the method disclosed by U.S. Pat. No. 4,905,587 is that the liquid smoke has to travel with the meat substrate along the entire length of the stuffing horn prior to encasement in the flexible casing. Whilst it is noted that U.S. Pat. No. 4,905,587 is concerned to provide only a thin layer of liquid smoke on the meat substrate so as to mimic the effect of traditional smoking, this means that the method of U.S. Pat. No. 4,905,587 would be unsuitable for applying greater amounts of fluid additive to the substrate, because the interaction between the meat substrate and a contiguous layer of liquid smoke of greater depth than is contemplated by U.S. Pat. No. 4,905,587, at the point of contact juxtaposed the nozzle and along the length of the stuffing horn, will inevitably lead to occasional fracturing of the meat substrate in the stuffing horn, and substantial penetration of the liquid smoke into cracks opened up between fragmented sections of the substrate. Product affected in this way will be unusable and will therefore have to be thrown away.

Furthermore, the apparatus disclosed by U.S. Pat. No. 4,905,587 is not suitable for dispensing onto the sausage substrate liquid additives containing particulate matter such, for example, as ground seasonings, e.g. ground peppercorns.

It will further be appreciated by persons skilled in the art that it is generally undesirable in the food industry to provide such a long common path for meat substrate and liquid additive as the stuffing horn of U.S. Pat. No. 4,905,587. This apparatus will be difficult to clean between batches, and the apparatus presents a large surface area within the nozzle and stuffing horn where meat and liquid may be allowed to remain in contact for extended periods of time if the apparatus is not cleaned properly. This presents an unacceptable health risk. The length of the common meat/liquid path also means that when the liquid additive is changed between batches to provide different flavoured products, the meat remaining in the stuffing horn must be "run-through" to exhaust all of the previous flavouring to ensure that no product is produced which is contaminated with the previous flavouring. This is clearly wasteful.

The method of U.S. Pat. No. 4,905,587 also suffers from the disadvantage that it cannot be used for applying liquid smoke to co-extruded meat products, such for example as those disclosed in the present applicants' previous European patent application no. EP-A-0024790.

It is the object of the present invention to alleviate some or all of the problems recited above. In particular it is an object of the present invention to provide an improved method for applying a liquid additive to a meat substrate which is encased in a flexible casing using a stuffing horn, wherein the length of the path along which the liquid additive contacts the substrate prior to encasement is minimised. In this connection, it is a further object of the invention to provide a method of making a meat product comprising a liquid additive which is more hygienic as compared with the method disclosed by U.S. Pat. No. 4,905,587. It is yet another object of the invention to provide apparatus for such a method which is easier to clean as compared with the apparatus of U.S. Pat. No. 4,905,587. It is yet another object of the invention to provide such apparatus which enables the liquid additive to be changed between batches with little or no wastage of meat.

It is yet another object of the invention to provide a method of applying a liquid additive to a meat substrate. in which the liquid additive may contain particulate material such, for example, as ground seasonings, e.g. whole or ground peppercorns.

It is yet another object of the invention to provide a method of applying a liquid additive to a co-extruded meat product of the kind described in EP-A-0024790 which may comprise an extruded core of proteinaceous meat material and a co-extruded, contiguous layer of fat emulsion.

It is yet another object of the present invention to provide novel meat products.

According to one aspect of the present invention there is provided a cooked, extruded meat product comprising a meat extrudate having an outwardly facing surface, which meat extrudate is impregnated with an additive in an additive zone which extends inwardly from said surface to a depth of at least 1 mm.

By the term "meat" as used herein is meant the processed or unprocessed, edible parts of any animal, bird or fish which are capable of being extruded, including emulsified fat and emulsified lean meat trimmings, as well as natural or extended lean muscle meat.

Said meat extrudate may comprise a unitary extrudate of lean muscle meat. Alternatively, the extrudate may comprise an extruded core and one or more contiguous, co-extruded layers of meat which are disposed wholly or partly around the core. Said extruded core may consist of lean muscle meat, and the meat forming the contiguous layer(s) may be the same or different from the core meat. In a preferred embodiment, the extrudate may comprise a core of lean muscle meat and a circumjacent, co-extruded layer of fat emulsion or a meat emulsion comprising emulsified lean meat trimmings.

Usually the additive zone will extend inwardly from the surface of the outermost layer of meat, or the core where no other layers are present. In some embodiments however, the additive may impregnate the core or a layer which is not the outermost layer, such that the additive zone is "sandwiched" between two contiguous layers of the extrudate.

As lean muscle meat to form one or more of the core or layers of the meat extrudate, may be used natural or extended diced, sliced or comminuted lean muscle meat pieces. In a preferred embodiment whole muscle meat pieces are employed. Where one or more co-extruded meat or fat emulsion layers are provided, the fat emulsion may be as disclosed in EP-A-0024790 to the applicants. Said additive may be a flavouring, colouring or seasoning of the kind generally well known to persons skilled in the art for use in the food industry.

Typically the cooked, extruded meat product will be sliced in a direction across the axis of extrusion. Said additive zone may extend into the meat to a depth of 1 to 10 mm, typically 1 to 5 mm. The remainder of the meat substrate may remain substantially free of the additive.

In another aspect of the present invention there is provided a method of making an extruded meat product comprising pumping a meat substrate through a stuffing horn to an extrusion head and thereafter through the extrusion head into a flexible casing, characterised by applying automatically fluid additive to an outwardly facing surface of the meat substrate as it debouches from the extrusion head into the flexible casing Said meat substrate may be extruded through one or more generally concentric meat dispensing orifices formed in the extrusion head, and the fluid additive may be applied to the meat substrate via a fluid dispensing orifice formed in the extrusion head wholly or partly around one or more of the meat dispensing orifices.

In one embodiment, a single meat dispensing orifice may be provided for extruding a lean muscle meat substrate therethrough, e.g. whole muscle meat, and the fluid dispensing orifice may be formed circumferentially around the meat dispensing orifice for applying fluid additive to the outer surface of the meat extrudate. In another embodiment, a first meat dispensing orifice may be provided for extruding a core of whole muscle meat therethrough, a second annular meat dispensing orifice may be provided for co-extruding a contiguous layer of meat around the core, and an annular fluid dispensing orifice may be provided for applying fluid additive to the outer surface of said contiguous layer of meat. Usually, said contiguous meat layer will consist of a fat or meat emulsion.

If is further envisaged that in some embodiments, the fluid dispensing orifice may be interposed between two concentric meat dispensing orifices, such that the fluid additive is dispensed between two neighbouring co-extruded meat layers.

Where the extrusion head comprises two or more meat dispensing orifices, the stuffing horn may be equipped with a corresponding number of generally coaxial conduits, each of which conduits is coupled with a respective one of the meat dispensing orifices. The meat(s) to form the core and layer(s) will be pumped in parallel through the conduits of the stuffing horn to the extrusion head.

In yet another aspect of the present invention there is provided a method of making a co-extruded meat product comprising co-extruding a lean muscle meat core and a contiguous fat or meat emulsion layer into a flexible casing, such that said fat or meat emulsion layer is disposed circumferentially of said core; characterised in that said fat or meat emulsion layer comprises a fluid additive.

Said extruded or co-extruded meat product may be subsequently cooked, and during the cooking process said fluid additive will penetrate into an additive zone juxtaposed the said outwardly facing surface of the meat substrate. In some embodiments sufficient fluid additive may be used that the additive permeates into the additive zone to a depth of at least 1 mm, and particularly 1–10 mm. The penetration of the fluid additive may be assisted by the denaturing of the meat at or towards said surface during the cooking process. Alternatively, the fluid additive may be applied in the form of a viscous paste which may remain substantially on the said surface during cooking. The paste may, by way of example, contain particulate seasonings such as whole or ground peppercorns. This is particularly desirable where the paste is applied to a co-extruded meat product comprising a whole muscle meat core and contiguous fat or meat emulsion outer layer.

As will be appreciated by persons skilled in the art, water may be "cooked out" of the meat product during cooking, particularly where high quality whole muscle or natural lean meat substrates containing more than 80% or 90% lean meat are used. When the fluid additive is applied to an outermost layer which comprises lean muscle meat this water may collect under the flexible casing. When the casing is stripped from the meat product, the meat product may therefore be wet, and it will be appreciated that this is undesirable in food processing plant.

Said flexible casing may be moisture impermeable. In yet another aspect of the present invention however, the flexible casing may be a moisture permeable casing such, for example, as a fibrous casing of the kind well known in the art. Such a moisture permeable casing will allow water "cooked-out" of the meat product to be removed as water vapour, so that the meat will be substantially dry when the casing is stripped away.

In the case of said co-extruded meat product, water "cooked-out" of the meat substrate may enter into said fat or meat emulsion layer. In yet another aspect of the present invention therefore, said fat or meat emulsion layer may be stabilized by the addition of a stabilizer of known kinds to maintain the integrity of the fat emulsion layer after cooking. Said stabilizer may be selected from one or more of collagenous animal, milk or vegetable proteins, emulsifiers, stabilizers, thickeners such, for example, as alginates/ "gums", methylcellulose and derivatives thereof, and natural and modified starches.

Alternatively, extended lean muscle meat substrates containing 60–70% meat protein and binder, e.g. water-retaining starch, may be employed, in which case water loss from the meat substrate may be reduced.

Where such extended meat substrates are used, or a co-extruded, stabilized fat or meat emulsion layer surrounds the lean muscle meat substrate, a moisture-impermeable casing may be employed, or a fibrous casing may be used to give the meat product a characteristic surface texture or quality.

Accordingly in yet another aspect of the invention there is provided an extruded meat product comprising a meat extrudate comprising a single, unitary extrudate or an outermost co-extruded layer, of lean muscle meat, which meat extrudate is received in a flexible casing; characterised by a layer of fluid additive intermediate the casing and the unitary extrudate or outermost layer, which fluid additive is adapted to penetrate into the meat during subsequent cooking, and in that said flexible casing is moisture permeable, thereby to permit water vapour to escape the extruded meat product during cooking.

In yet another aspect of the present invention there is provided a co-extruded meat product comprising a first core of lean muscle meat substrate and a second contiguous outer layer of fat or meat emulsion, which second layer is disposed circumferentially of said first core; characterised in that said fat or meat emulsion includes a fluid additive which is adapted to penetrate into the lean muscle meat core during subsequent cooking.

After cooking, the meat product will usually be allowed to cool. The casing sleeve will typically be inedible, and will be releasable from the meat product after cooling. After cooling therefore, the resilient sleeve may be stripped off the meat product, and the meat product may then be sliced.

In a different aspect of the present invention there is provided apparatus for making an extruded meat product, which apparatus comprises a stuffing horn comprising an upstream end and a downstream end, an extrusion head coupled to the downstream end of said stuffing horn, and meat pumping means for pumping meat substrate successively through the stuffing horn and extrusion head into a flexible casing carried on the stuffing horn, which extrusion head comprises:

- at least one meat extrusion conduit having an upstream end adapted to receive therein meat substrate from the stuffing horn for extrusion through the at least one meat extrusion conduit, and a downstream end which defines at least one meat dispensing orifice through which meat extrudate debouches from the at least one conduit into the flexible casing;
- and a cavity which surrounds the at least one meat extrusion conduit and is adapted to receive a fluid additive for application to the meat extrudate, said cavity having an inlet means for inletting the fluid, a fluid dispensing orifice disposed wholly or partly around the at least one meat dispensing orifice for application of the fluid to an outwardly facing surface of the substrate as it debouches from the at least one meat dispensing orifice into the casing, and closing means for closing the cavity at the upstream end thereof.

In some embodiments the extrusion head may comprise a single meat extrusion conduit and the cavity may be formed circumferentially therearound. In a different embodiment, however, the extrusion head may define a plurality of generally coaxial meat extrusion conduits, typically two, and the cavity may be formed around one or more of the conduits, typically around all of the conduits such that in use the fluid additive is applied to the outwardly facing surface of the outermost co-extruded layer of meat substrate. Of course in cases where the fluid dispensing cavity is disposed intermediate two coaxial meat extrusion conduits, the fluid additive will be dispensed between two co-extruded layers of meat substrate, such that in the resultant, uncooked meat extrudate, the fluid additive will be sandwiched between the said two layers.

Use of apparatus in accordance with the present invention may permit the application of a substantially uniform coating of additive to the outwardly facing surface of the meat extrudate as it debouches the at least one meat dispensing orifice. Application of the fluid additive to the meat substrate just before it is received in the flexible casing avoids the need to move the fluid additive within the stuffing horn in contact with the meat substrate, and allows close control over the amount of additive metered on the substrate, and the production of a meat product having a uniform layer of fluid additive applied thereto. The additive will be protected by the casing, and will be prevented from coming-off the meat during subsequent handling of the product.

Said extrusion head will usually be capable of being decoupled from the stuffing horn to allow cleaning of the extrusion head. In some embodiments, the extrusion head may comprise a first inner body part which defines the at least one meat extrusion conduit, and a second outer body part which mates with the first part to define the said cavity intermediate the first and second parts. The extrusion head may therefore be disassembled to allow cleaning of the interior of the cavity.

As the fluid additive does not travel through the stuffing horn, and as the extrusion head can readily be accessed for cleaning by being decoupled from the stuffing horn, disassembled and washed out, the apparatus of the present invention can be used to produce a succession of batches of meat product using different fluid additives for each successive batch, with little or no wasted meat substrate when the fluid additive is changed between batches.

Furthermore, as the fluid additive is applied to the meat as it is extruded into the casing, there is no risk of the fluid additive causing fragmentation of the meat substrate as it travels along the stuffing horn and through the extrusion head, even where a large amount of additive is used to achieve substantial penetration of the fluid additive into the meat.

A liquid additive of low viscosity may optionally be used which may be less problematical with respect to automation of the process as compared with the viscous syrup additives used in prior art, and has the advantage that it may penetrate more readily into the surface of the meat substrate. Of course, the viscosity of the additive fluid can be varied according to the type of additive used and the desired end result, and as mentioned above, the use of a paste may be desirable in some cases.

Said flexible casing may form a tight fit around the meat extrudate which will have the effect of promoting the migration of the fluid additive into the surface of the meat. The ingress of the fluid additive into the meat substrate may also be promoted by the quality of the meat itself which in the case of whole muscle meat may be relaxed and expanded towards its outer surface as it debouches through the extrusion head. The fluid additive may be sufficiently "wet" to aid entry of the fluid into the surface of the meat substrate.

In some embodiments, the fluid additive may be delivered slowly through the fluid dispensing orifice such that it is "dribbled" onto the outwardly facing surface of the extrudate to form a non-uniform pattern on the surface of the meat. Alternatively, the fluid additive may be pumped through the fluid dispensing orifice at a higher rate so as to provide a substantially uniform coverage over the entire outwardly facing surface of the extrudate.

The flexible sleeve may encircle the stuffing horn and extrusion head. The fluid additive may be applied to the outwardly facing surface of the meat extrudate just upstream of a location where the meat contacts the inner surface of the casing, such that the fluid is inletted into a space between the meat extrudate and the casing. Said extrusion head may be constructed and arranged so as to shield the meat product from the casing until the fluid additive has been dispensed onto the surface of the meat.

The meat product may be extruded as a succession of separate "logs" of pre-determined length. Once the extrudate has reached the pre-determined length a cutting and sealing apparatus of known kind may cut the extrudate and seal the cut ends of the casing on the trailing end of the log and the leading end of the next successive log. According to the invention, therefore, the flexible casing may be closed at a location downstream of the extrusion head, and the forward movement of the meat extrudate itself may cause the casing to be dispensed on to the extrudate from the stuffing horn in a progressive manner.

Fluid additive may be delivered to the inlet means through a supply conduit disposed juxtaposed the stuffing horn. Said supply conduit may be disposed between the stuffing horn and the resilient sleeve.

Following is a description by way of example only with reference to the accompanying drawings of methods and apparatus for carrying the present invention into effect.

BRIEF DESCRIPTION OF THE DRAWINGS

FIG. 3 is a side view, partly in cross-section, of a stuffing horn and extrusion head in accordance with the present invention.

FIG. 8 is a side-view, partly in section, of part of the apparatus of FIG. 7.

FIG. 9 shows a slice of yet another cooked extruded meat product according to the present invention.

DETAILED DESCRIPTION OF PREFERRED EMBODIMENTS

Figure 1:
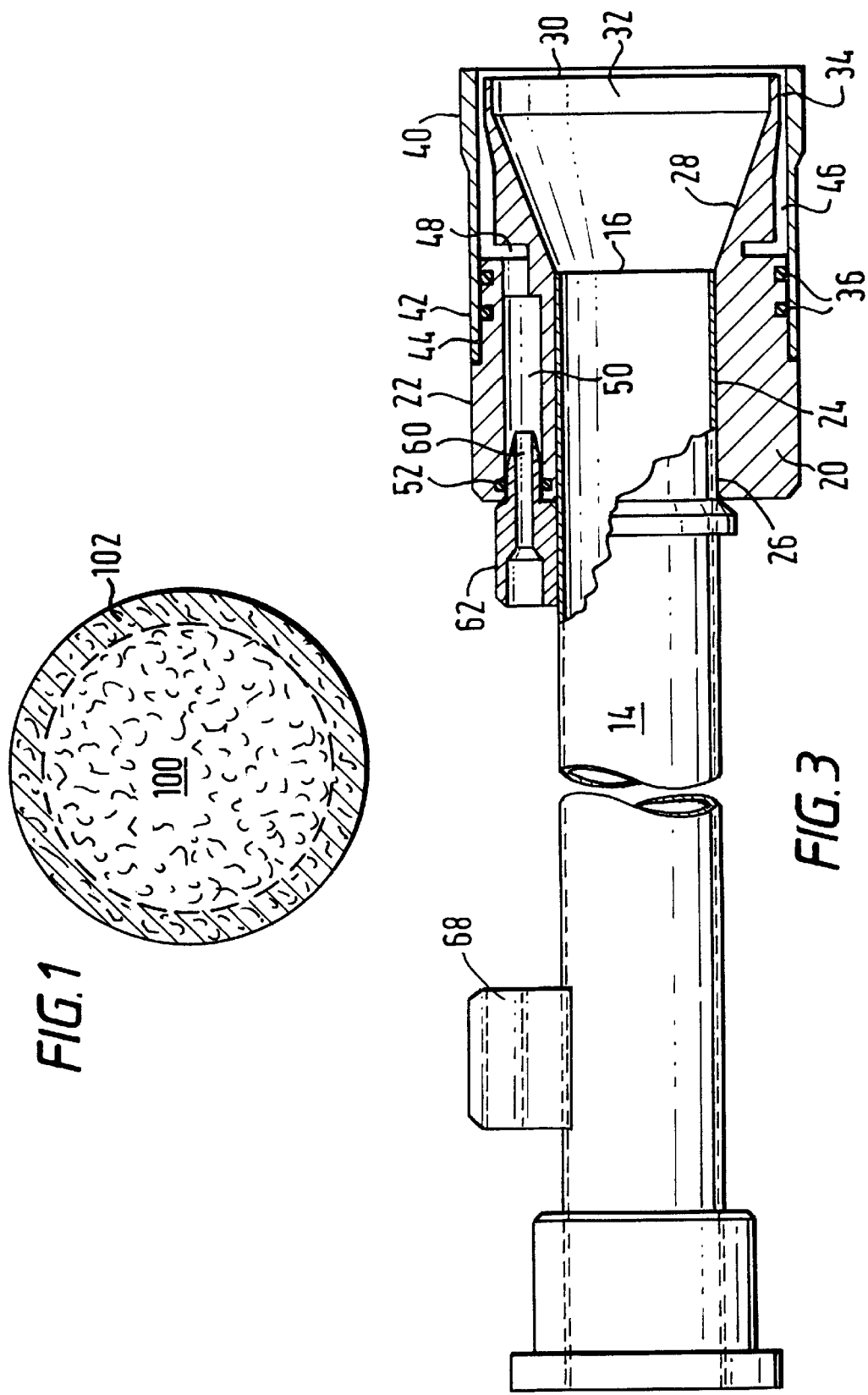
FIG. 1 shows a slice of a cooked, extruded meat product in accordance with the present invention.

A first example of a cooked, extruded meat product in accordance with the present invention is illustrated in FIG. 1. This product comprises a meat substrate (100) which is extruded as a single, unitary extrudate of generally circular cross section. The extrudate has a generally cylindrical additive zone (102) which extends inwardly from the outer surface of the meat extrudate (100) to a depth of more than 1 mm, preferably 1 to 10 mm. As meat substrate (100), lean muscle meat from any animal, bird or fish may be employed which is capable of being extruded. In the present example however, turkey meat is used. The lean muscle meat may have a high lean meat content of more than say 75 to 80% by weight. Alternatively, extended meat may be used comprising 60 to 70% lean muscle meat and the rest as binders such, for example, as starch binders.

Said additive zone (102) is impregnated with an additive such, for example, as a colouring or flavouring. Said additive is applied in liquid form to the outer surface of the meat extrudate (100) in a manner as hereinafter described. During subsequent cooking, the additive penetrates into the additive zone (102); this penetration is assisted by denaturation of the lean muscle meat structure at or towards the outer surface of the extrudate (100) during cooking. The liquid additive may additionally contain seasoning, such for example as particles of pepper or other spices or herbs. Generally, these will not penetrate into meat, but will remain on the surface.

After cooking, which may typically be carried out in a steamer, the meat product may be sliced across the direction of extrusion to form thin, generally circular slices as shown in FIG. 1.

Figure 2:
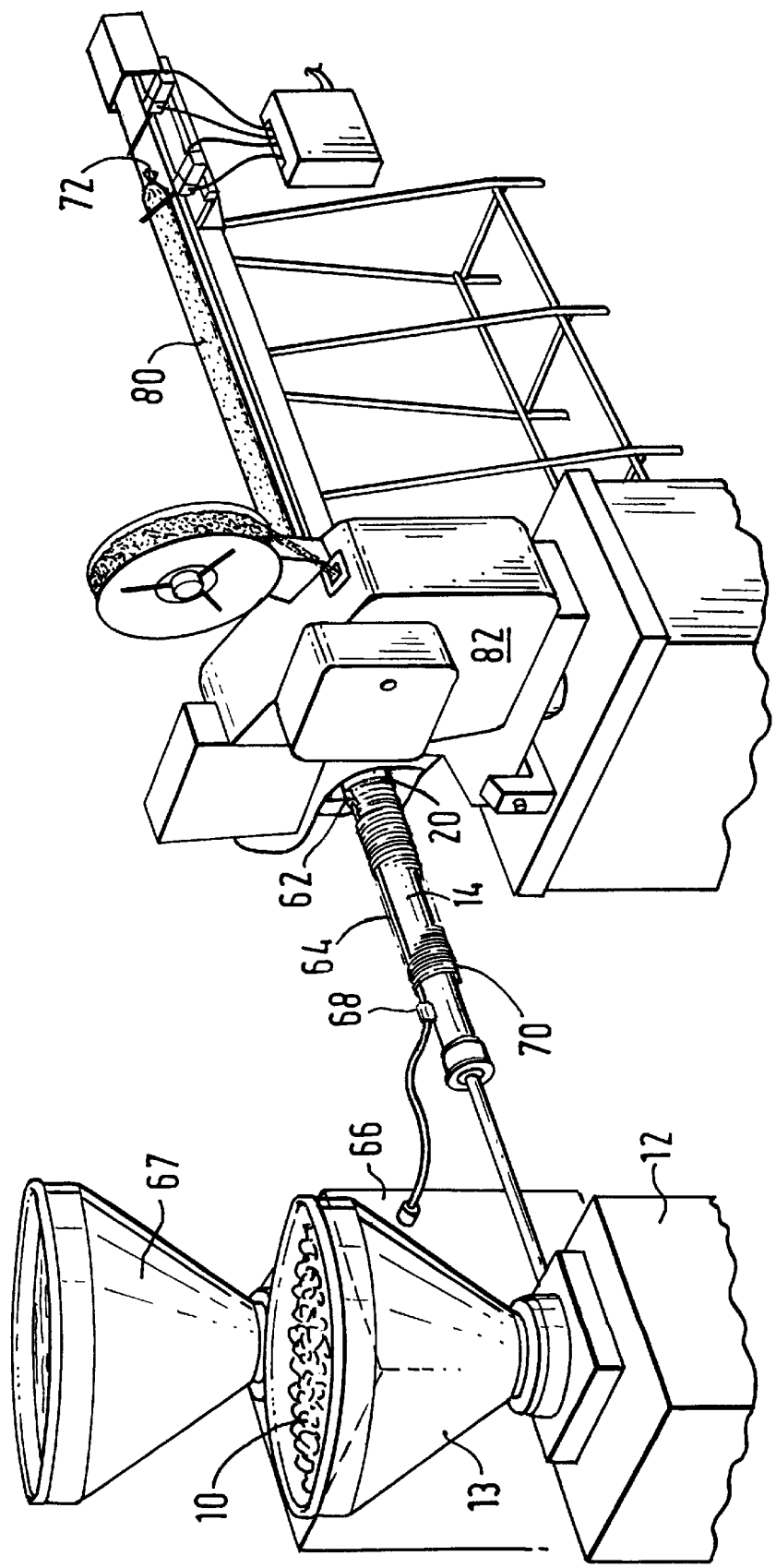
FIG. 2 is an isometric view of apparatus for performing the present invention.

A process for making the meat product illustrated in FIG. 1 comprises pumping meat (10) by a meat pump (12) from a first hopper (13) through an elongate steel pipe (14) of circular cross-section to an extrusion head (20) (see FIG. 2). The meat (10) may comprise comminuted, diced or sliced meat pieces, or preferably whole muscle meat may be employed, as by deboning the carcase of an animal or bird and supplying all of the meat to the meat pump.

Before supplying the meat to the first hopper (13), the meat may be massaged with salt and/or other functional ingredients to draw out from the meat matter a liquid meat protein which acts as a meat glue.

Said extrusion head (20), as shown in FIG. 3, comprises a generally cylindrical body part (22) which defines a central passageway (24) therethrough. The upstream end (26) of the passageway (24) is adapted to accommodate the downstream end (16) of the pipe (14), such that lean muscle meat pumped through the pipe (14) is delivered into the passageway (24). The passageway (24) is flared radially outwardly at the point indicated at (28) in the downstream direction in the form of a frustocone, and terminates at the downstream end (34) of the body part (22) in a short cylindrical section (32). The widening of the passageway (24) towards the downstream end (30) thereof permits the whole muscle meat to expand and relax slightly as it debouches from the passageway (24).

Said body part (22) carries thereon a cylindrical ring part (40) which encircles the downstream end (30) of the body part (22). An upstream end (42) of the ring part (40) is accommodated in a rebate (44) formed in the outer surface of the body part (22), and the downstream end (44) of the ring part (40) projects slightly in the downstream direction beyond the downstream end (30) of the body part (22).

The downstream end (34) of the ring part (40) is spaced radially inwardly from the body part (22) to define an annular cavity (46) therebetween. The outer surface of the downstream end (30) of the body part (22) is shaped at (34) to provide a constriction at the downstream end of the annular cavity (46).

The rebated part (44) of the body portion (22) is equipped with one or more O-rings (36) as shown in FIG. 3 which are accommodated in grooves milled in the outer surface of the body part (22) and form a fluid-tight seal with the inner surface of the ring part (40).

The outer surface of the extrusion head (20) defined by the ring part (40) and body part (22) is substantially smooth for reasons which will be described hereinafter.

Intermediate the downstream end (34) of the ring part (40) and the O-rings (36), the body part (22) is formed with an inwardly directly circumferential channel (48) which communicates with a narrow cylindrical inlet passageway (50) drilled through the body part (22) in parallel with the passageway (24) between the channel (48) and the upstream end (26). In juxtaposition with the upstream end (26), the body part (22) accommodates an O-ring (52) in the inlet passageway (50) to form a seal with a nozzle part (60) of a connector (62) carried on the outer surface of said pipe (14). The connector (62) is adapted for connection to a flexible tube (64) as shown in FIG. 2 for supplying a meat additive fluid from a second hopper (67) by a fluid pump (66) to the annular cavity (46) via the inlet passageway (50). The tube (64) may optionally pass through a tube retaining member (68) also carried by the pipe (14) at a distance upstream of the extrusion head (20).

Meat additive fluid such for example as a solution of meat colouring, penetrating flavouring or external seasoning is pumped through the tube (64), the connector (62), the inlet passageway (50) and the annular cavity (46) in succession for application to the outer surface of the meat extrudate (10) as it debouches from the downstream end (30) of the passageway (24). The downstream end (34) of the ring part (40) which projects beyond the body part (22) serves to direct the fluid onto the meat.

A releasable detent device (not shown) may be provided for holding the body and ring parts (22, 40) of the extrusion head (20) together. Furthermore, a releasable locking means may be provided for locking the downstream end of the pipe (14) in the passageway (24).

As shown in FIG. 2, the pipe (14) and extrusion head (20) carry thereabout a resilient sleeve (70) of the kind which is well known to a person skilled in the art for encasing meat products. Said sleeve (70) will typically be moisture-permeable, e.g. a fibrous casing, to allow water, which is "cooked-out" of the lean muscle meat during subsequent cooking, to escape as water vapour. Alternatively, where a highly extended lean muscle meat substrate is used which contains a high proportion of binders such as starch, the sleeve may be substantially moisture impermeable.

Figure 4:
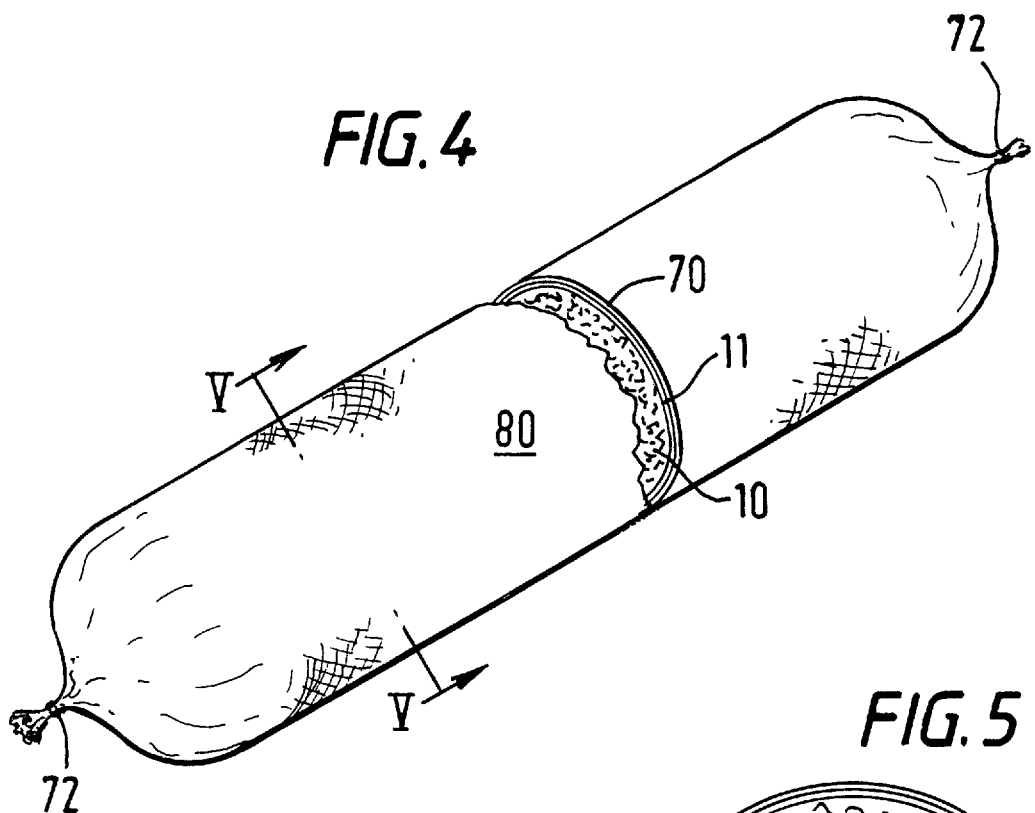
FIG. 4 is an isometric view, partly cut-away, of an extruded meat product of the invention before cooking.

The sleeve (70) is rucked to form a plurality of circumferential folds so that a sleeve of substantial length can be accommodated on the pipe (14). The meat product (10) is extruded through the extrusion head (20) in logs (80) of pre-determined length, as shown in FIG. 4. When one log (80) of the pre-determined length has been produced, the log (80) is cut by a cutting and sealing device (82) of a kind which is well known to a person skilled in the art which also seals both cut ends of the sleeve (70) as shown at (72) in FIG. 2. The next succeeding log (80) is thus extruded into the closed end (72) of the sleeve (70) such that extrusion of the log causes or allows the sleeve (70) to pay-out from about the pipe (14) onto the exterior surface of the log. The smooth outer surface of the extrusion head allows the sleeve (70) to pass thereover without obstruction.

The resilient sleeve (70) is dimensioned to form a tight fit round the meat extrudate as it debouches from the extrusion head (20). The forwardly protruding end (44) of the ring part (40) prevents the sleeve (70) from contacting the outer surface of the extrudate until the fluid additive has been applied to the meat. Said fluid additive is thus supplied to an annular space between the extruded meat log (80) and the sleeve (70) and can be delivered at a slow rate such that the fluid "dribbles" through the annular cavity (46) to form a non-continuous coating on the meat extrudate (10). Alternatively, the fluid can be pumped under substantial pressure between the sleeve (70) and the meat extrudate (10) to form a uniform coating.

The viscosity of the fluid can be adjusted according to the desired end result, but advantageously the fluid will be sufficiently wet to assist in penetration of the additive into the meat extrudate (10) during cooking. It will be appreciated that the migration of the fluid additive into the meat will be promoted by the quality of the meat after extrusion, and also by the pressure exerted between the sleeve (70) and the extrudate (10).

The fluid additive may, for example, comprise a colouring additive, e.g. caramel, or a flavouring such as honey or "Chinese" flavouring. The fluid may also contain seasoning such as whole or ground peppercorns. Additionally the fluid additive may be buffered at a mildly acidic pH to breakdown the meat protein towards the surface of the meat extrudate (10) to facilitate migration of the fluid flavouring into the meat.

Sufficient liquid additive may be supplied between the sleeve and the meat substrate that during subsequent cooking the additive permeates the meat to a depth of at least 1 mm, typically 1–10 mm, and more typically 1 to 5 mm.

Figure 5:
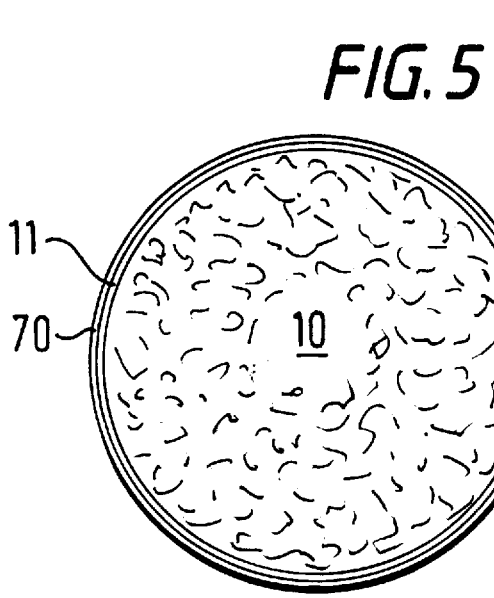
FIG. 5 is a cross-section through the extruded product of FIG. 4.

In use therefore fluid meat additive will be delivered onto the outer surface of the meat extrudate (10) from the annular cavity (46) to form a ring of fluid around the emerging portion of the meat extrudate (10). This ring of fluid will be entrained by the meat and surrounding sleeve (70) to advance progressively with the log (80). This "intermediate" product is illustrated in FIGS. 4 and 5 which show the layer of fluid additive (11) between the sleeve (70) and meat extrudate (10).

A complete log of meat product thus formed is then transferred to a steam cooker for cooking the meat (10) and allowed to cool. During cooking the additive liquid will penetrate into the additive zone of the meat extrudate to a depth typically of up to 10 mm. This penetration of the additive will be facilitated by the break-down of the lean muscle meat structure towards its surface. After cooling, the sleeve may then be stripped off and the meat product sliced, e.g. in a direction transverse the axis of extrusion to form circular slices of meat (100) as shown in FIG. 1. The slices include a circumferential additive zone (102) which is impregnated and marinated with the additive.

Figure 6:
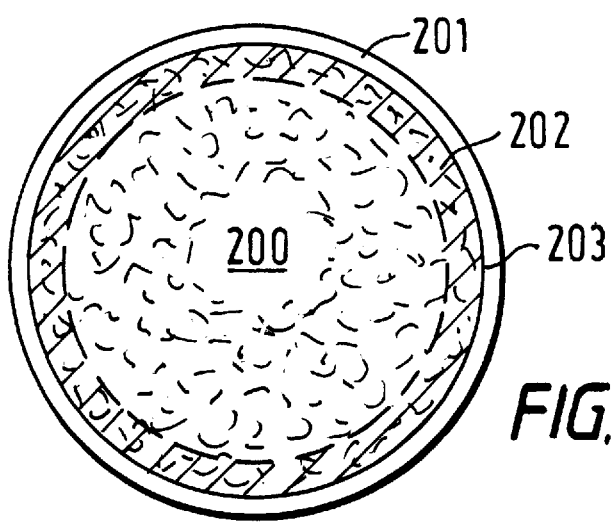
FIG. 6 shows a slice of another cooked meat product in accordance with the present invention.

A different cooked, extruded meat product in accordance with the present invention is illustrated in FIG. 6. In this example, the meat product comprises an extruded core (200) of lean muscle meat and a co-extruded layer (201) of a mobile fat or meat emulsion, which meat emulsion comprises emulsified lean meat trimmings. Contiguous the fat or meat emulsion layer (201), the lean meat core (200) comprises an outwardly facing surface (203), and an additive zone (202) which extends inwardly from the outwardly facing surface (203) to a depth of more than one millimeter. As with the first example described above, the additive zone (202) is impregnated with additives such as colouring or flavouring. The present example can be manufactured using apparatus of the kind described above which is suitably modified to co-extrude a layer of fat or meat emulsion around the meat extrudate (200), such that liquid additive is dispensed intermediate the lean meat and fat or meat emulsion extrudates.

Figure 7:
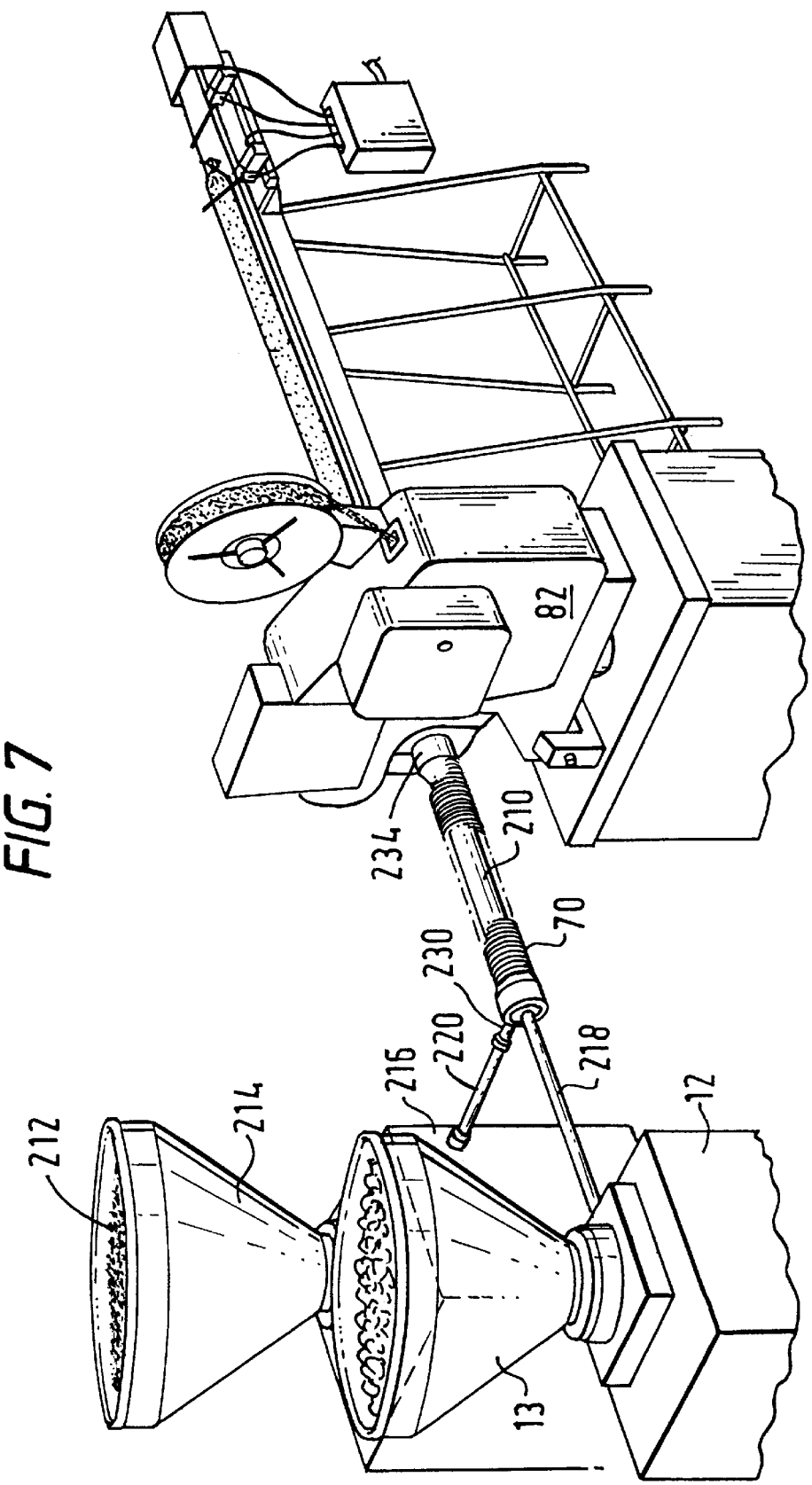
FIG. 7 is an isometric view of another apparatus for making the product of FIG. 6.

Alternatively, the additive can be mixed with the fat or meat emulsion, which fat or meat emulsion can then be co-extruded with the meat substrate using apparatus of the kind described in EP-A-0024790 to the applicants. During subsequent cooking, additive will migrate from the fat or meat emulsion layer into the additive zone (202) of the extruded lean muscle meat core (200). Naturally, some additive will remain in the emulsion layer (201). Apparatus suitable for making a co-extruded meat product of this kind is illustrated in FIGS. 7 and 8. Parts of this apparatus which are common to the apparatus illustrated in FIGS. 2 and 3 are indicated by the same reference numerals. The apparatus comprises an extrusion mandrel (210) fed with whole muscle turkey meat or other lean muscle meat from the first hopper, and fat or meat emulsion (212) from a second hopper (214) by a vane pump in a housing (216). Pipes (218) and (220) extend from the hoppers (13) and (214) respectively to a central passage and surrounding annulus of mandrel (210) as will be described with reference to FIG. 8. The fat or meat emulsion (212) comprises liquid additive of the kind previously described.

The elongate extrusion mandrel (210) has inner and outer concentric sections (222) and (224) of circular cross section. The inner section (222) provides a totally unobstructed passage for the passage of turkey meat which is solid in consistency, often comprising large, natural pieces. An axial inlet (226) at the rear end of the inner section (222) allows the entry of this meat from pipe (218). The mandrel outer section or casing (224) defines with the inner section (222) an annular space (228) through which the mobile meat or fat emulsion (212) forming the outer layer of the food product flows. A radially extending pipe (230) at the rear end of the mandrel (210) provides an inlet for the fat or meat emulsion from pipe (220). The inner and outer sections (222), (224) are connected by vanes (232).

The extrusion head (234) is formed by the laterally enlarged front end part of the mandrel (210) and is seen in section in FIG. 8. The space (228) is constricted here to define an annular frontwardly facing extrusion orifice (236). The main length of the space (228) through which the emulsion flows is relatively wide to allow free flow of the emulsion which, though fluid, may be viscous especially in the cool ambient conditions used within the food industry. The frontwardly facing extrusion orifice (238) of passage (222) is by contrast of enlarged area to allow the lean muscle meat some degree of physical relaxation just before it debouches the extrusion orifice (238).

As with the previous example, the extrusion mandrel carries thereon a rucked stock of flexible casing material, into which the co-extruded meat and fat product is delivered as the latter debouches the extrusion head (234). The product is manufactured in logs (80) of predetermined length, and once this length of meat and fat has be extruded through the extrusion head (238), the cutting and sealing device (82) cuts the log and casing and forms two sealed ends (72) as previously described.

Each log (80) of meat product is subsequently cooked, typically in a steam cooker, during which cooking, the additive contained in the fat or meat emulsion (212) migrates into the additive zone (202) of the central extruded meat core (200). In view of the high proportion liquids in the emulsion layer (201), it is necessary to stabilise the emulsion, so that it does not break-down during the cooking process. To this end, one or more binders may be mixed homogeneously in the emulsion such, for example, as collagenous animal, milk or vegetable proteins, emulsifiers, stabilizers, thickeners such as alginates/"gums", methylcellulose, derivatives of methylcellulose, and starches of both natural and modified forms respectively.

After cooking, the flexible casing can be stripped off as described above, and the meat product may be sliced. The presence of the outer emulsion layer (201) has the effect that water "cooked-out" of the meat during cooking is largely absorbed within the emulsion layer (201), and the use of a moisture permeable, fibrous casing (70) is not therefore necessary. A substantially moisture-impermeable casing can therefore be used. Alternatively, a fibrous casing can be used to obtain a particular surface quality of the meat product if desired.

Another example of a cooked extruded meat product in accordance with the invention is illustrated in FIG. 9. In this example, the meat product comprises a first extruded lean muscle meat core (300) of generally circular cross section and a second contiguous extruded lean muscle meat layer (302). The core (300) comprises an outwardly facing surface (301) which is contiguous an inwardly facing the surface (303) of the co-extruded layer (302). An additive zone (305) extends inwardly in the central core (300) from the outwardly facing surface (301) to a depth of 1mm or more, and also extends outwardly in the co-extruded surrounding layer (302) from the inwardly facing surface (303). The additive zone (305) is permeated by additives such as flavourings or colourings of the kind described above. The meat product of this present example can be manufactured by interposing a layer of liquid material between the lean muscle meat core (300) and surrounding co-extruded layer (302) as they debouch from an extrusion head. During subsequent cooking, the additive penetrates into the two lean meat layers (300,302), although the additive will tend to penetrate further into the inner meat layer (300) as compared with the outer co-extruded layer (302).

Apparatus for manufacturing the meat product of this example may comprise hoppers, pumps and a mandrel of the kind hereinbefore described with reference to and as shown in FIGS. 7 and 8 of the accompanying drawings, with a modified extrusion head. The extrusion head may be of the kind described with reference to and as shown in FIG. 3 for applying liquid additive to the outwardly facing surface (301) of the lean muscle meat core (300), but having in addition a further extrusion orifice (not illustrated) around the annular additive cavity of the FIG. 3 extrusion head for dispensing the co-extruded layer (302).

Figure 10:
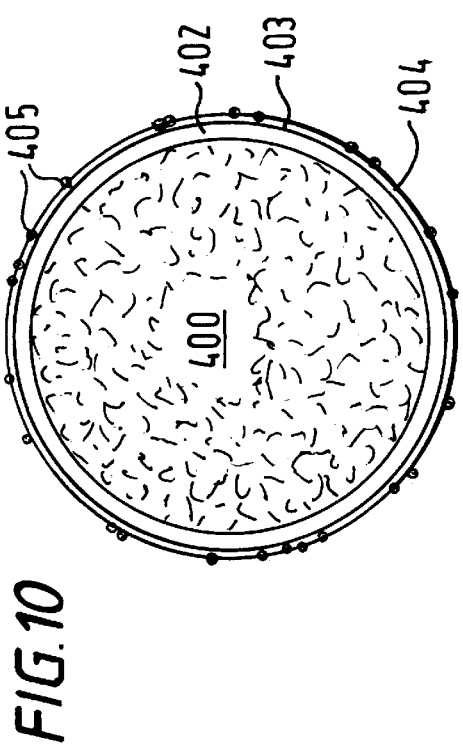
FIG. 10 shows a slice of yet another cooked, extruded meat product according to the invention.

FIG. 10 shows yet another example of a cooked, extruded meat product according to the present invention. In this embodiment the meat product comprises an extruded core (400) of a lean muscle meat substrate such, for example, as whole muscle pork meat, and a co-extruded circumferential, contiguous layer (402) of meat or fat emulsion. The outer surface (403) of the meat or fat emulsion layer (402) is coated with a coating layer (404) which may comprise a food flavouring such, for example, as a traditional Chinese flavouring, and may optionally comprise particulate material such for example as ground seasonings, e.g. whole or ground peppercorns (405).

Figure 11:
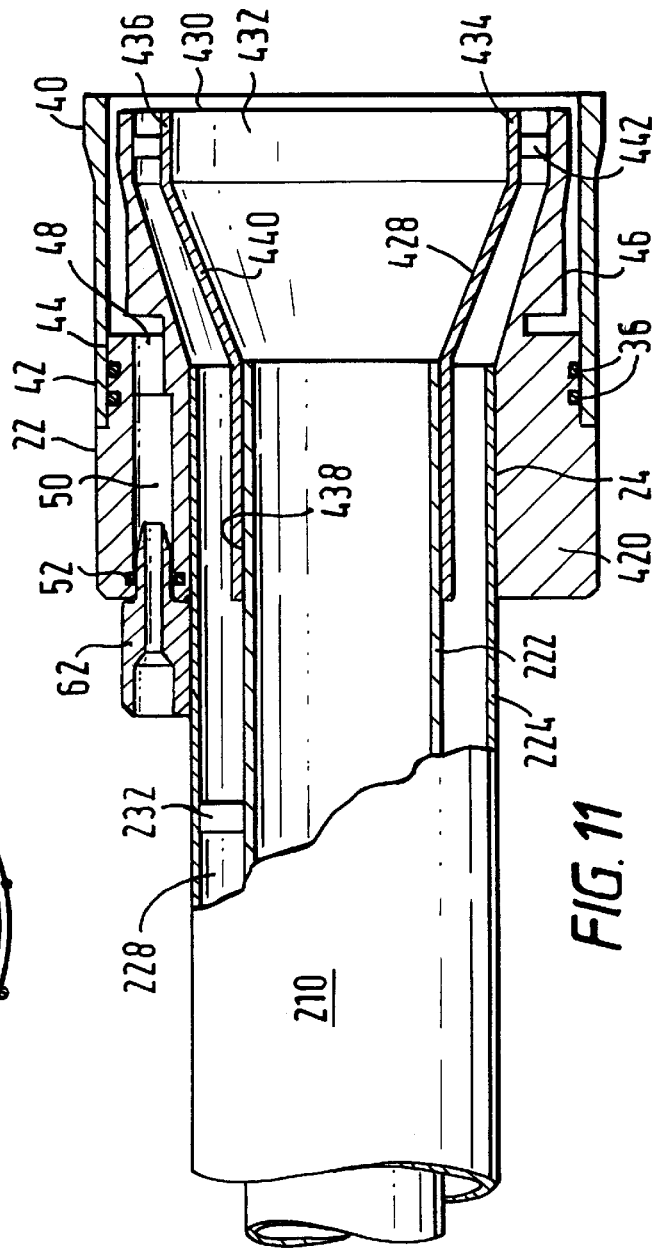
FIG. 11 shows a side view, partly in section, of a different extrusion head according to the present invention.
Figure 12:
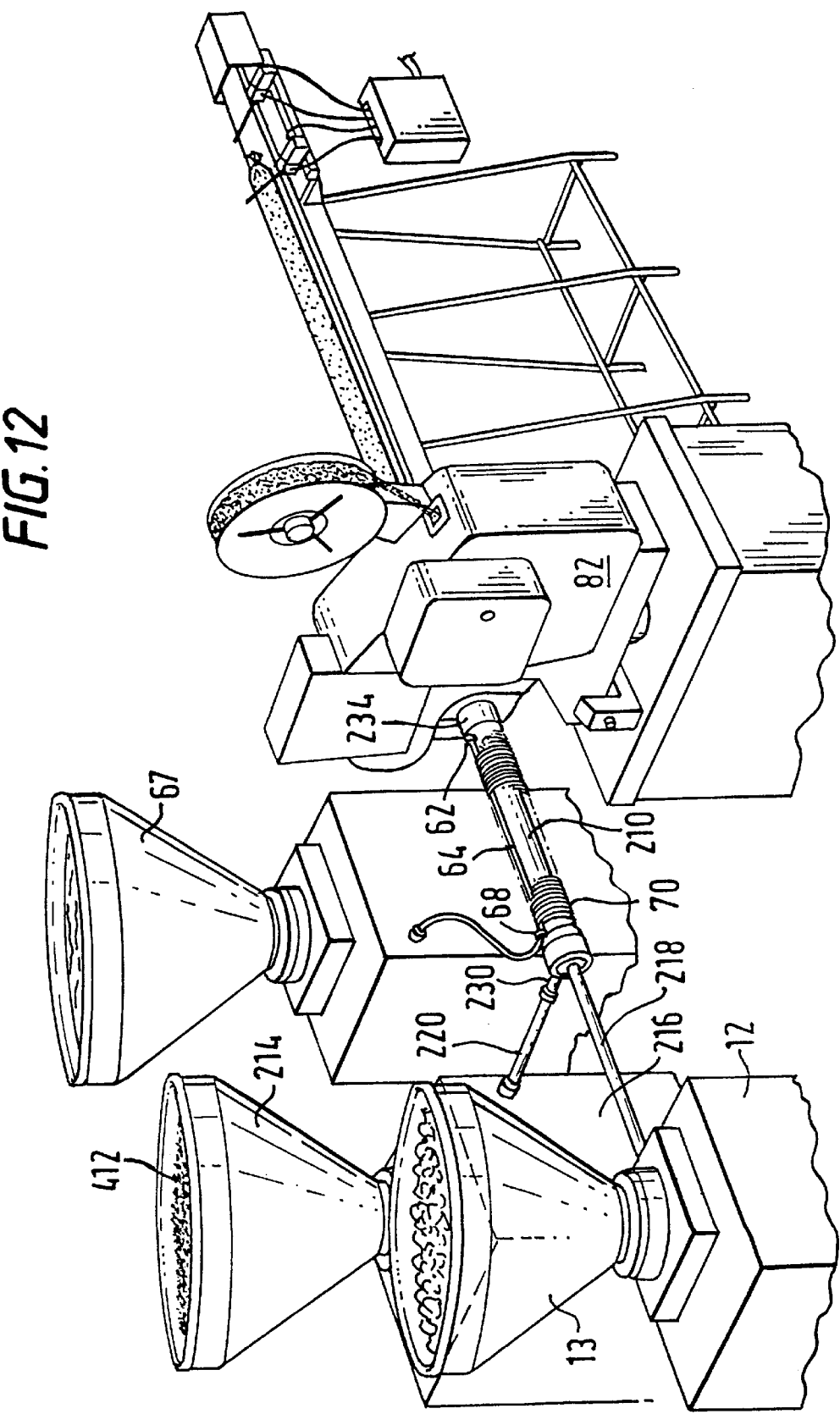
FIG. 12 shows an isometric view of yet another apparatus for making the product of FIG. 10.

The product illustrated in FIG. 10 may be manufactured by the apparatus according to the present invention which is illustrated in FIGS. 11 and 12. Parts of the apparatus illustrated in FIGS. 11 and 12 which are common to the apparatus illustrated in FIGS. 2 and 3 or FIGS. 7 and 8 are indicated by the same reference numerals.

The apparatus of FIGS. 11 and 12 can be considered as combining features of the two apparatus shown in FIGS. 2 and 3 and FIGS. 7 and 8 respectively. The apparatus of FIGS. 11 and 12 comprises an elongate extrusion mandrel (210) of the kind shown in FIGS. 7 and 8 which comprises inner and outer concentric sections (222,224) of circular cross-section. Lean muscle meat (400), such for example as whole muscle pork meat, is pumped through an inner meat conduit defined by the inner section (222) and a mobile fat or meat emulsion (412), which may be free of flavourings or colourings, is pumped along an outer meat conduit of annular cross-section defined between the inner and outer section (222,224). The pork lean meat (400) and mobile fat or meat emulsion (402) are moved along the mandrel (210) by respective vane pumps to an extrusion head (420) which is similar to the extrusion head as shown in FIG. 3.

As seen in FIG. 11 however the cylindrical body part (22) of extrusion head (420) carries in the central passageway (24) a shaped partition member (436). Said partition member (436) comprises a rear portion (438) which is generally cylindrical, and a front portion (440) which is generally frustoconical. The shaped partition (436) is mounted in the central passageway (24) by means of circumferentially spaced webs (442) which extend between the front portion (440) of the partition and the body part (22) of the extrusion head (420). The inner section (222) of the mandrel (210) mates with the cylindrical portion (438) of the partition as shown in FIG. 11 such that lean muscle meat substrate pumped along the inner conduit of the mandrel (210) is extruded through the extrusion conduit defined by the frustoconical front portion (440) of the partition (436). The outer section (224) of the mandrel (210) mates with the body part (22) of the extrusion head (420), such that the mobile fat or meat emulsion (412) is extruded through a second extrusion conduit which is defined by the outer surface of the partition (436) and the inner surface of the body part (22). The mobile fat or meat emulsion is thus co-extruded with the meat substrate to form a contiguous, circumferential layer of fat or meat emulsion around the lean muscle meat extrudate.

A fluid additive is pumped from a third hopper (67) through a flexible tube (64) and connector (62) into an inlet passageway (50) formed in the body part (22) of the extrusion head (420). The fluid additive then enters the annular cavity (46) and is applied to the outer surface of the fat or meat emulsion layer (402) as it debouches from the downstream end of the second meat extrusion conduit.

As shown in FIGS. 2 and 7 the mandrel (210) and extrusion head (420) carry thereabout a resilient sleeve (70) which may be moisture-permeable or substantially moisture-impermeable. The co-extruded lean meat (400) and fat or meat emulsion layer (402) are delivered into the flexible casing downstream of the extrusion head (420) as the co-extrudate debouches from the extrusion head (420), and the fluid additive is delivered between the emulsion layer (402) and the casing (70).

The resultant cased, extruded-meat product may be cooked, cooled and sliced as hereinbefore described.

As noted above, the fluid additive in this embodiment may have a paste-like consistency, and may comprise particulate ground seasonings such as peppercorns (405). A fluid additive of this kind will remain substantially on the surface of the emulsion layer (402) during cooking.

We claim:

1. A method of making an extruded meat product comprising pumping a meat substrate through a stuffing horn to an extrusion head and thereafter through the extrusion head into a flexible casing, characterized by applying automatically fluid additive to an outwardly facing surface of the meat substrate as it debouches from the extrusion head into the flexible casing, wherein said meat substrate is impregnated with said fluid additive in an additive zone which extends inwardly from said surface to a depth of at least one millimeter.

2. A method as claimed in claim 1, wherein said flexible casing is a moisture permeable casing.

3. A method as claimed in claim 2, wherein said moisture permeable casing is a fibrous casing.

4. A method of making a co-extruded meat product comprising co-extruding a lean muscle meat core and contiguous meat or fat emulsion layer into a flexible casing, such that said fat or meat emulsion layer is disposed circumferentially of the core; characterized in that said fat or meat emulsion layer comprises a fluid additive, and wherein sufficient fluid additive is used so that the additive permeates into an additive zone to a depth of at least 1 mm during cooking.

5. A method of making an extruded meat product comprising pumping a meat substrate through a stuffing horn to an extrusion head and thereafter through the extrusion head into a flexible casing, wherein a fluid additive is automatically applied to an outwardly facing surface of the meat substrate as it debouches from the extrusion head into the flexible casing.

6. A method as claimed in claim 5 wherein the meat substrate is extruded through one or more generally concentric meat dispensing orifices formed in the extrusion head and the fluid additive is applied to the meat substrate via a fluid dispensing orifice formed in the extrusion head wholly or partly around one or more of the meat dispensing orifices.

7. A method as claimed in claim 6, wherein a core of lean meat is extruded through a first meat dispensing orifice, a contiguous layer of meat is co-extruded through a second annular meat dispensing orifice formed around the first orifice, and fluid additive is applied to the outer surface of the contiguous meat layer through an annular fluid dispensing orifice formed around the second meat dispensing orifice.

8. The method of claim 5, wherein said flexible casing is moisture permeable.

9. The method of claim 8, wherein said flexible casing is a fibrous casing.

10. A method of making a co-extruded meat product comprising co-extruding a lean muscle meat core and a contiguous meat or fat emulsion layer into a flexible casing, such that said fat or meat emulsion layer is disposed circumferentially on the core, wherein said fat or meat emulsion layer comprises a fluid additive.

11. A method as claimed in claim 10 wherein the fat or meat emulsion layer is stabilized by the addition of a stabilizer for maintaining the integrity of the fat or meat emulsion layer after cooking.

12. A method as claimed in claim 11, wherein said stabilizer is at least one member selected from the group consisting of collagenous animal proteins, milk proteins, vegetable proteins, emulsifiers and thickeners.

13. A method as claimed in claim 12, wherein said thickeners are selected from the group consisting of alginates, methylcellulose, methylcellulose derivatives, natural starches and modified starches.

14. A co-extrudate meat product comprising a first core of lean meat and a second contiguous outer layer of fat or meat emulsion, which second layer is disposed circumferentially of said first core, wherein said fat or meat emulsion includes a fluid additive which is adapted to penetrate into the lean meat core during subsequent cooking.

15. A co-extrudate meat product as claimed in claim 14, wherein sufficient fluid additive is included in said meat or fat emulsion that the additive permeates into the lean meat core to a depth of at least 1 mm during subsequent cooking.

16. A cooked, co-extruded meat product comprising:
    a first co-extruded core of lean meat having an outwardly facing surface; and a second co-extruded outer layer of meat or fat emulsion, which second layer is disposed circumferentially of said first core and is contiguous with said outwardly facing surface;

wherein said meat product further comprises a flavoring or coloring additive which is added in liquid form to said meat or fat emulsion before co-extrusion and ingresses into said first core during cooking.

17. A cooked, co-extruded meat product as claimed in claim 16, wherein said product is sliced in a direction across the axis of co-extrusion.

18. A cooked, co-extruded meat product as claimed in claim 16, wherein said additive ingresses into said core on cooking to a depth of at least 1 mm.

19. A cooked, co-extruded meat product as claimed in claim 16, wherein said fat or meat emulsion is stabilized by the addition of a stabilizer for maintaining the integrity of said second layer after cooking.

20. A cooked, co-extruded meat product as claimed in claim 19, wherein said stabilizer comprises at least one member selected from the group consisting of collagenous animal proteins, collagenous milk proteins, collagenous vegetable proteins, emulsifiers and thickeners.

21. A cooked, co-extruded meat product as claimed in claim 20, wherein said thickeners are selected from the group consisting of alginates, methylcellulose, methylcellulose derivatives, natural starches and modified starches.

22. A cooked, co-extruded meat product as claimed in claim 16, wherein said flavoring is selected from the group consisting of honey and Chinese flavoring.

* * * * *